United States Patent
Moffa et al.

[11] Patent Number: 5,918,937
[45] Date of Patent: Jul. 6, 1999

[54] FOLDING SEAT

[75] Inventors: Michael D. Moffa, Glenview; Karim Youssef Mikhail, Chicago, both of Ill.

[73] Assignee: Freedman Seating Co., Chicago, Ill.

[21] Appl. No.: 08/880,842

[22] Filed: Jun. 23, 1997

[51] Int. Cl.$^6$ .................................................. B60N 2/30
[52] U.S. Cl. .......................... 297/324; 297/331; 297/334
[58] Field of Search ............................. 297/14, 324, 336, 297/331, 238, 334, 335, 332, 333

[56] References Cited

U.S. PATENT DOCUMENTS

| | | | |
|---|---|---|---|
| 820,344 | 5/1906 | Brierley | 297/324 X |
| 2,479,361 | 8/1949 | Hower | 297/331 X |
| 3,522,970 | 8/1970 | Francis | 297/335 |
| 3,594,037 | 7/1971 | Sherman | 297/332 X |
| 4,460,215 | 7/1984 | Chamberlain et al. | 297/14 |
| 4,799,632 | 1/1989 | Baymak et al. | 297/332 X |
| 4,902,069 | 2/1990 | Lehnert | 297/14 |
| 5,282,668 | 2/1994 | Heussner et al. | 297/14 X |
| 5,498,052 | 3/1996 | Severini et al. | 297/14 X |
| 5,498,062 | 3/1996 | Holdampf | 297/14 X |
| 5,577,805 | 11/1996 | Glinter et al. | 297/335 X |
| 5,588,700 | 12/1996 | Homier | 297/14 X |

FOREIGN PATENT DOCUMENTS

| | | | |
|---|---|---|---|
| 698367 | 1/1931 | France | 297/332 |
| 1015209 | 7/1952 | France | 297/324 |
| 455828 | 1/1928 | Germany | 297/335 |
| 61-750028 | 4/1986 | Japan | 297/335 |

*Primary Examiner*—Peter M. Cuomo
*Assistant Examiner*—David E. Allred
*Attorney, Agent, or Firm*—Irwin C. Alter

[57] ABSTRACT

A folding seat comprises a support frame, a seat back and a seat bottom extending generally horizontally in a first position. The bottom is pivotally connected to the frame to permit the bottom to pivot to a generally vertical second position. The seat bottom is connected to a pivot arm system which typically connects to the seat back at a position at or near the bottom of the seat back and which pushes the bottom of the seat back rearwardly as the seat bottom is raised from the first to the second position. The pivot arm system also moves the bottom of the seat back forwardly as the seat bottom is lowered from the second to the first position. This system can optionally include a three point safety belt system or a plurality of seats.

6 Claims, 4 Drawing Sheets

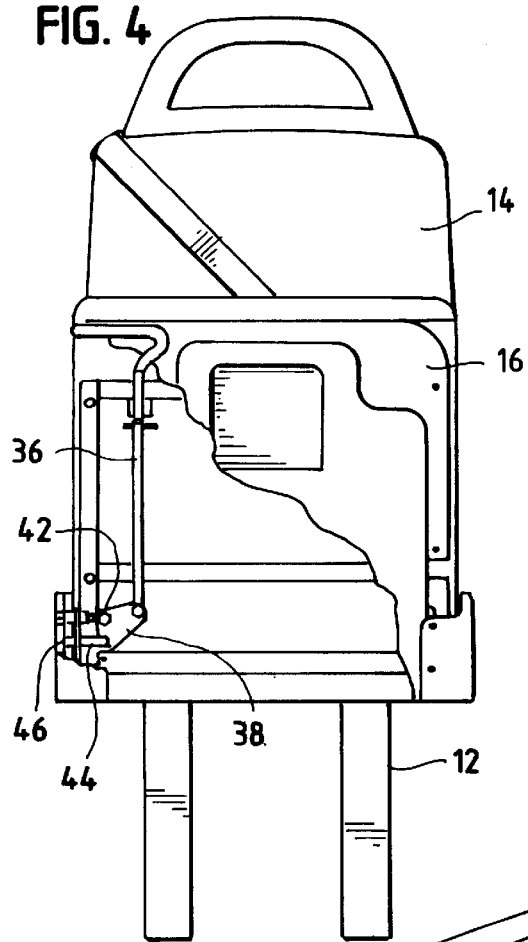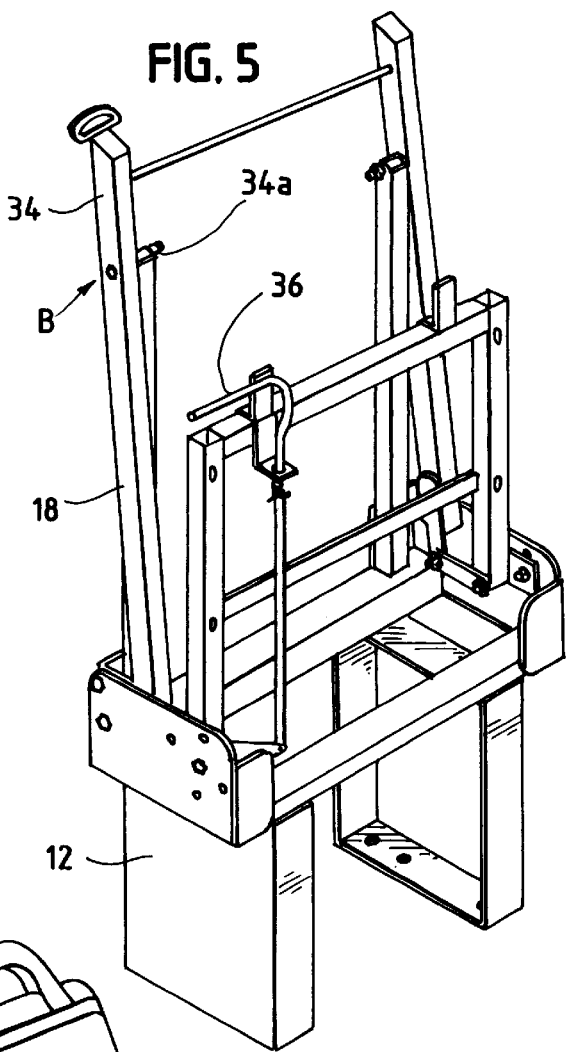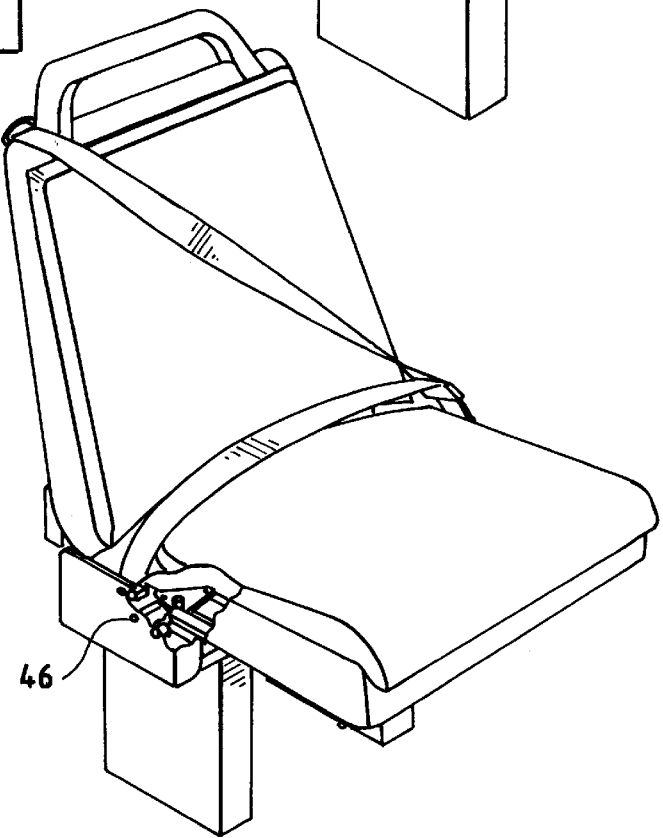

FOLDING SEAT

BACKGROUND OF THE INVENTION

Folding seats are well known and commonly used in theaters, athletic stadiums, and the like, Recently, a new use for folding seats is on buses and trains, where the seat can fold upwardly, out of the way to make room for a wheel chair.

To accomplish this, it is of course desirable for the folding seat to move out of the way as much as possible. By this invention, a new technique for a folding seat is provided in which the seat can fold upwardly, and the back of the seat can simultaneously move rearwardly so that the seat is even more out of the way than it normally would be with conventional folding seats of comparable seat thickness. Thus, a folding seat may be comfortable and safe for the user, but it may also be folded out of the way providing an increased amount of spacing between it and the seat or other structure in front of it, to provide added room for a wheel chair or the like.

This principle may of course be used in any desired folding seat, where an increase in space in front of the seat is desired. For example, this can provide larger transverse aisles in front of rows of such folding seats. At the same time, the back of the folding seat in its seating position can assume a forward slope that is comfortable to the back of the user.

DESCRIPTION OF THE INVENTION

The seat of this invention may be used, if desired in situations where space for wheelchairs or luggage is desired, coupled with the need to hold the occupant of the seat securely via optional seat belts. The seat comprises generally a seat frame which supports a seat base and a seat back in generally orthogonal or perpendicular planes to each other in a deployed position. The seat has the capability of rotating so that the seat bottom and the seat back are generally parallel in stowed position. The seat back, which may be at a comfortable reclining angle, when in its seated configuration, moves in concert with the seat base by means of a link, which provides additional clearance space adjacent to the stowed seat. A seat belt comprising a lap belt and a shoulder belt may be attached to the seat frame.

More specifically, the folding seat of this invention comprises a support frame, a seat back, and a seat bottom, The seat bottom extends generally horizontally in a first position. The back and bottom are carried on the support frame, with the bottom being pivotally connected to the frame to permit the seat bottom to pivot to a substantially vertical second position next to the seat back.

In accordance with this invention, the seat bottom is connected to a pivot arm system which connects to the seat back at a position which is typically at or near the bottom of the seat back, and which pushes the bottom of the seat back rearwardly as the seat bottom is raised from the first to the second position. The pivot arm system also moves the bottom of the seat back forwardly again as the seat bottom is lowered from the second to the first position.

Preferably, the pivot arm system comprises a first pivot member which is attached to the seat bottom, and a second pivot member which is attached to the seat back. Typically at least one pivot arm is pivotally attached to the first pivot member at one end of the pivot arm, and the second pivot member is similarly attached at the other end of the pivot arm.

The pivot arm occupies a position that is generally vertical when the seat bottom is generally horizontal in the first position. The pivot arm also occupies a position that is generally horizontal when the seat bottom is generally vertical in the second position. Thus, when the pivot arm is pushed into such a generally horizontal position in the second position, in turn it pushes the seat bottom rearwardly as called for in this invention. Correspondingly, when the pivot arm is pulled back toward a generally vertical position, it pulls the seat bottom forwardly again, so that the seat back is pulled forwardly when the seat bottom is down, and the seat back is pushed rearwardly when the seat bottom is up.

This can be accomplished when the first pivot member swings an end of the pivot arm to which it connects in an arc downwardly as the seat bottom moves from horizontal to vertical, so that the pivot arm pushes the seat back rearwardly as the pivot arm moves toward its generally horizontal position.

Typically, the seat back of this invention moves forwardly and rearwardly, as impelled by the pivot arm system, about a fulcrum in a substantially pivotal motion at or adjacent an upper part of the seat back. Thus, it is primarily the bottom of the seat back that moves rearwardly, while the top of the seat back remains substantially stationary, apart from some relatively small pivoting action, as will be more fully explained hereafter.

Typically, the support frame defines a stationary seat back frame portion which connects to the upper part of the seat back, to provide the pivoting action described above.

While the back of the seat moves rearwardly as the seat bottom goes up, the seat back does not necessarily impinge into a transverse aisle to its rear, providing a net saving of space as the seat is folded up.

The folding seat of this invention may also have a hand release rod carried by the seat bottom, which is connected to control the release of a latch for releasably locking the seat bottom in at least the generally vertical, second position, and optionally in the generally horizontal first position as well if desired.

Thus, since the seat back moves rearwardly as the seat bottom folds up, a thicker seat back and/or seat bottom may be utilized with this folding seat to provide comfortable cushioning or the like, while at the same time the seat back may be at a comfortable sloping angle in the seating configuration. Then the seat back may move rearwardly to accommodate a thick seat bottom so that the seat bottom may be completely folded upwardly, providing the improved spacing at the front of the seat without any loss of space behind the seat.

The seat belt extends through a loop which is attached to a conventional seat retractable belt receptacle that releasably contains a portion of the seat belt to allow for the belt to be fastened on each side and across the body of the passenger after the passenger is seated so that when the passenger want to, he can unlock the belt and get up from the seat. Then the belt is drawn back to the belt receptacle to enable easy flipping of the seat to the vertical position as seen in FIG. 1.

DESCRIPTION OF THE DRAWINGS

FIG. 4 is a front elevational view of the seat of FIGS. 1–3, with a portion of the seat bottom broken away;

FIG. 5 is a perspective view with the seat in frame in its substantially vertical position;

FIG. 6 is a perspective view of the seat in a generally horizontal position with a portion B of the seat bottom broken away;

DESCRIPTION OF SPECIFIC EMBODIMENTS

Figure 1:
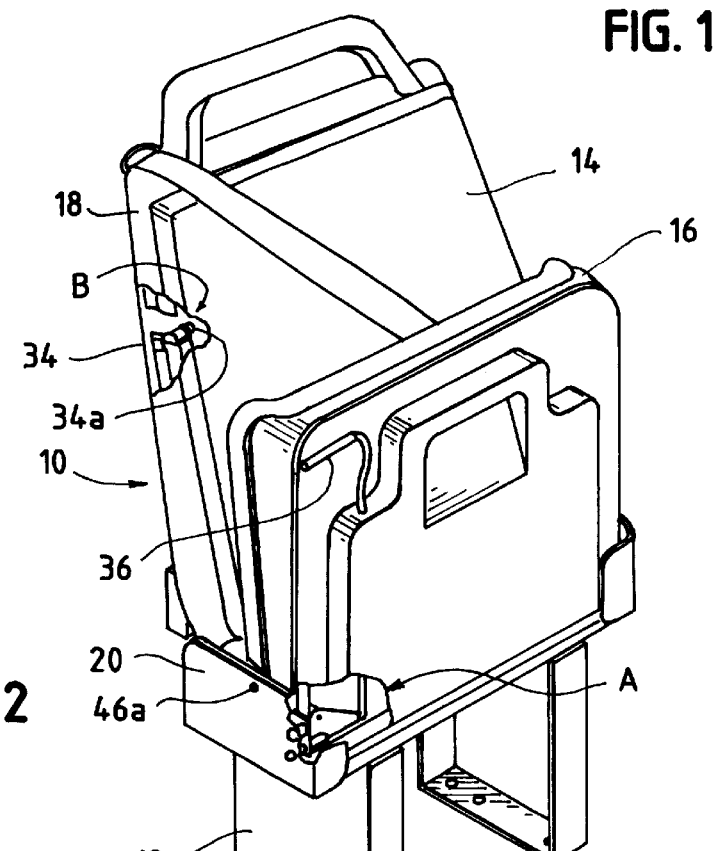
FIG. 1 is a perspective view of the folding seat of this invention with broken away portions A & B.

Referring to the drawings, FIG. 1 shows a folding seat 10 in accordance with this invention, having a support frame 12, a seat back 14, and a seat bottom 16, shown in FIG. 1 to be in its second, vertical position. Seat back 14 is shown to be retained in and by a stationary seat back frame portion 18 which is attached to the rest of frame 12, while seat back 14 itself is movable in the manner previously described.

Figure 2:
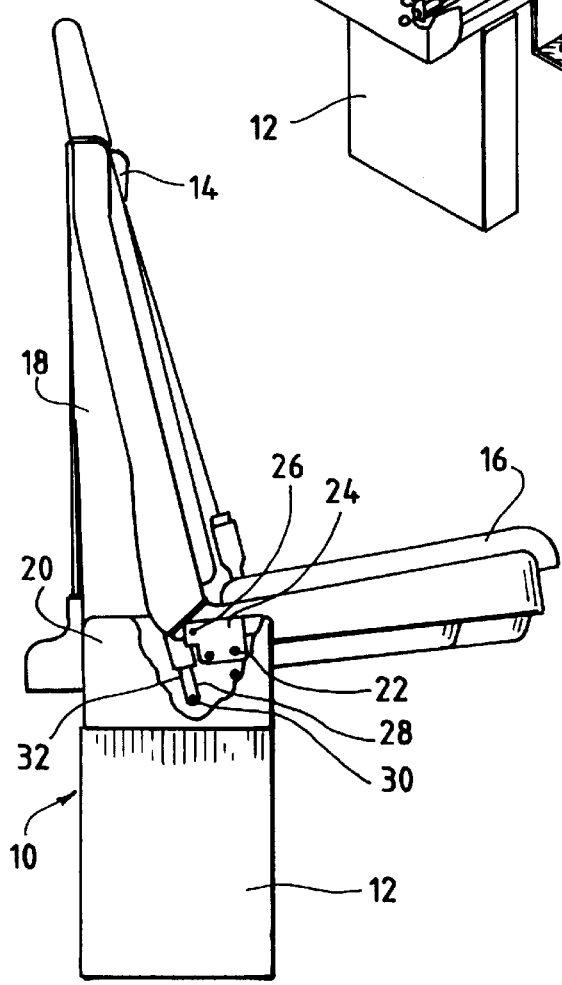
FIG. 2 is a side elevational view of the folding seat of FIG. 1, with a portion A broken away, showing the seat in the first, generally horizontal position.

FIG. 2 shows seat 10 in its first, generally horizontal position, where seat bottom 16 is substantially horizontally positioned to receive a user.

Seat bottom 16 is pivotally connected to vertical walls 20 of frame 12 by a first pivot 22 on each side of seat 16.

First pivot 22 extends through a first pivot member 24, which comprises a plate that is secured to seat 16. Pivot member 24 is attached at second pivot 26 to one end of a pivot arm 28, which is better seen in FIG. 3.

Pivot arm 28 connects to a third pivot 30 at its other end, carried by second pivot member 32, which extends as an arm downwardly from seat back 14 and is connected thereto in a substantially fixed manner.

Figure 3:
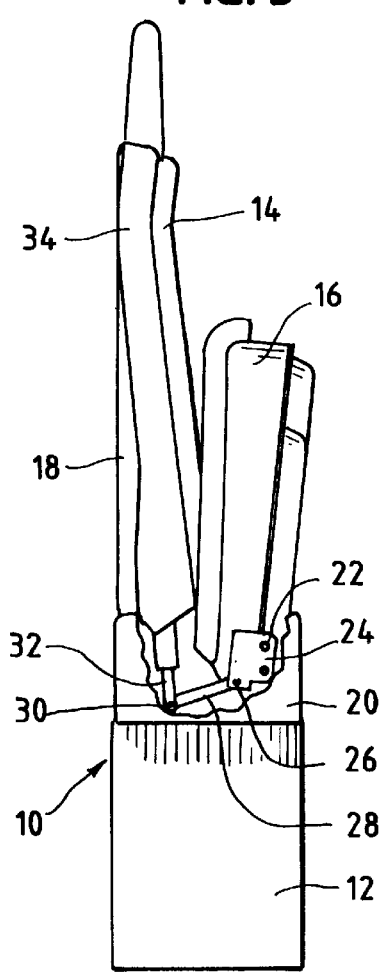
FIG. 3 is a side elevational view of the seat of FIG. 2 showing the seat in the second, substantially vertical position.

Second pivot 26 is typically spaced rearwardly (relative to the seat) of first pivot 22 and slightly above first pivot 22, as shown. Thus, when seat 16 is raised into the configuration shown in FIG. 3, second pivot 26 pivots in an arc downwardly as seat bottom 16 moves from the generally horizontal to the generally vertical position, taking the connected end of pivot arm 30 with it. Also, when the seat is raised, pivot arm 28 moves from its generally vertical position of FIG. 2 to a more horizontal position as shown in FIG. 3, forcing the lower end of seat back 14 to become more spaced from the lower end of seat bottom 16. Seat bottom 16 is attached to frame 12 by first pivots 22. Thus, second pivot member 32 and the lower end of seat back 14, which are not directly attached to frame 12, are forced rearwardly as shown, in a type of motion that approximates pivotal motion with the pivot axis being adjacent to upper portion 34 of the seat back, as more clearly seen in FIG. 5. The actual motion may not be a pure pivoting motion, but may merely approximate pivoting as the seat back bends, or the like. However, the bottom of seat back 14 moves substantially more than the upper portion thereof in this pivoting action. FIGS. 9–12 are elevational views of the seat pivot arm systems going from the seating position to where the seat is folded upwardly as in FIG. 12.

In the first seating configuration of the seat as shown in FIG. 2, the seat back 14 exhibits a slope from the vertical that can be comfortable for the user. Nevertheless, upon folding of seat bottom portion 16 upwardly, seat back 14 is forced rearwardly as shown in FIG. 3, which makes room for a thickly cushioned seat bottom 16, so that the entire seat 10 can be narrower in its folded configuration without the need for eliminating cushioning or other thicknesses of the respective seat back and bottom.

It can be seen that the seat back support frame portion 18 may be substantially stationary. Frame portion 18 may grasp seat back 14 in the vicinity of area 34 shown as 34a so as to provide an effective pivoting point for seat back 14. This is clearly seen in portion B of FIG. 1 and in FIG. 5 as well.

Figure 8:
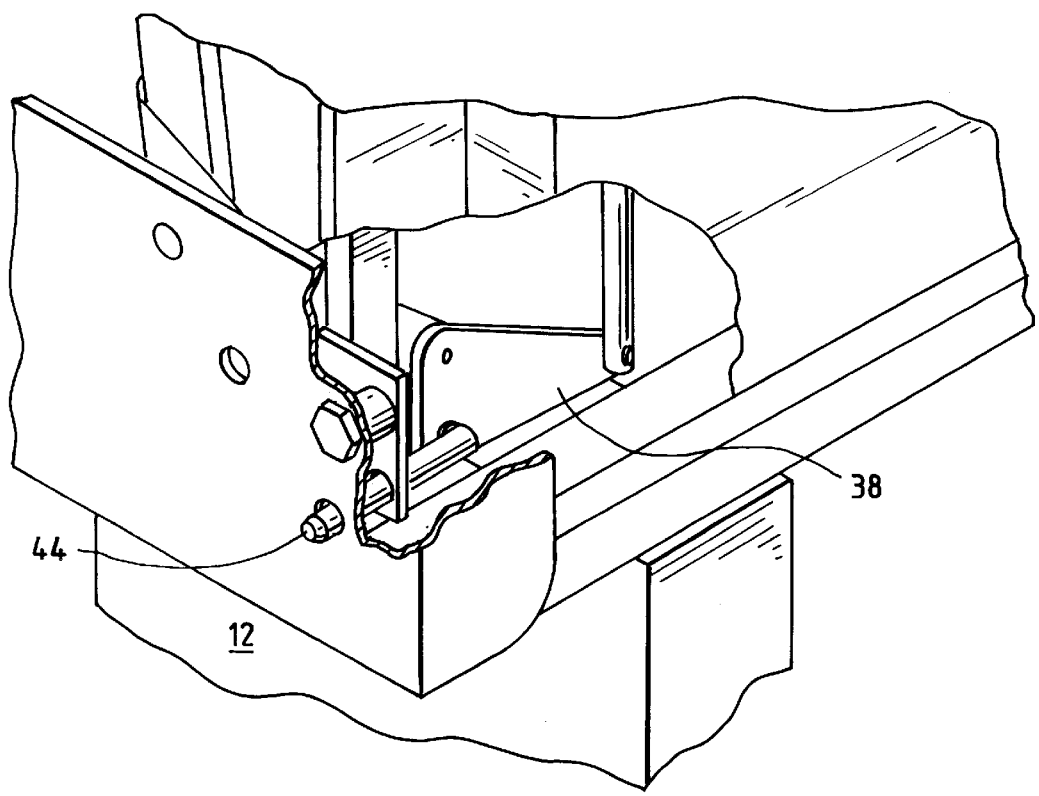
FIG. 8 is an enlarged perspective view of a broken away portion of the seat illustrated in FIG. 1.
Figure 9:
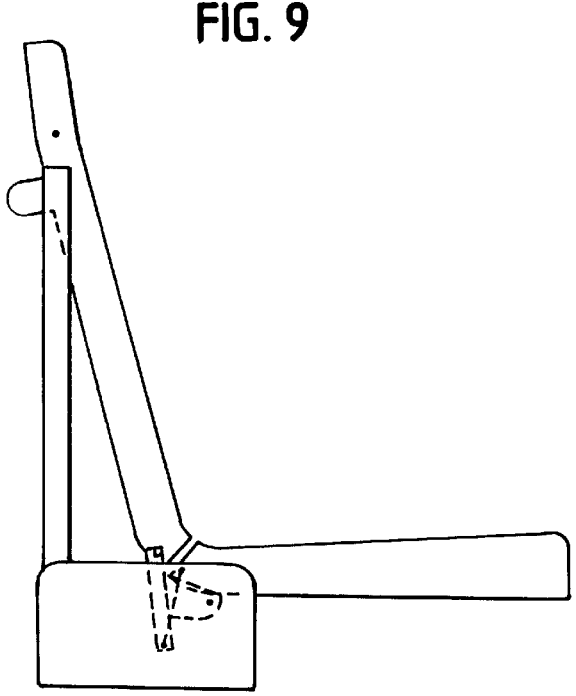
FIGS. 9–12 illustrate different positions of the pivot members as the seat bottom moves from generally horizontal to generally vertical.
Figure 10:
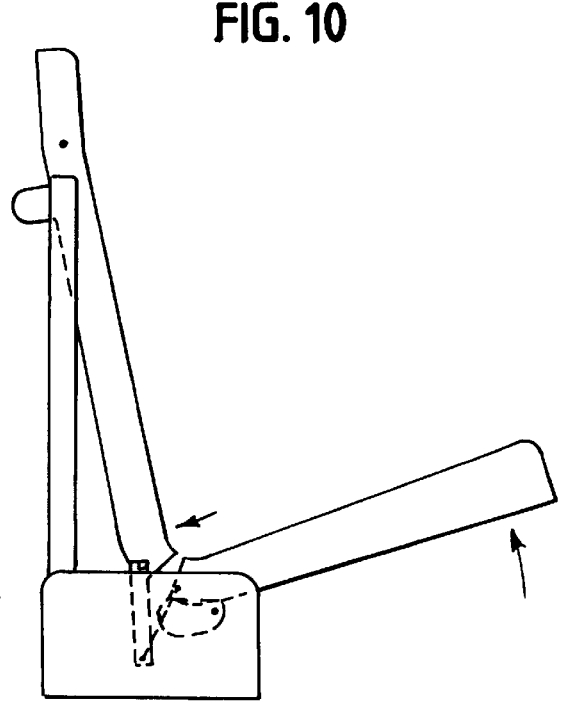
Figure 11:
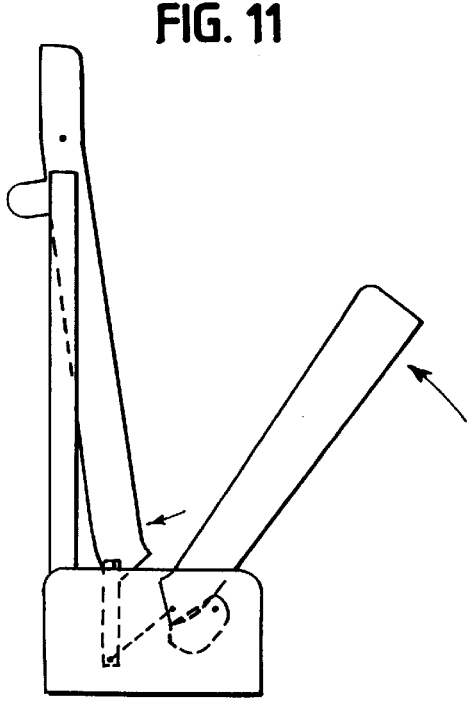
Figure 12:
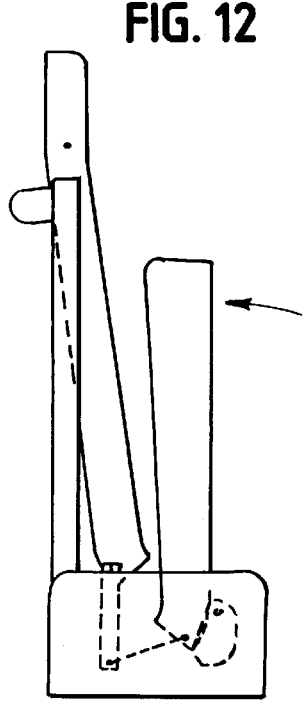

Seat bottom 16 may carry a hand release rod 36, which is connected to control the release of a latch 38 for releasably locking the seat bottom 16. This may be particularly accomplished when the seat bottom 16 is in its generally vertical, second position. Latch 38 comprises a plate 40 which pivots about a latch pivot 42 and carries a latch pin 44 that releasably occupies an aperture 46 in frame 12 when locking is desired. Thus, seat 16 can be locked in vertical relation by manual manipulation of release rod 36, and correspondingly released therefrom by pulling rod 36 to pull pin 44 out of aperture 46, as seen in portion A in FIG. 1 a well as FIG. 8.

Figure 7:
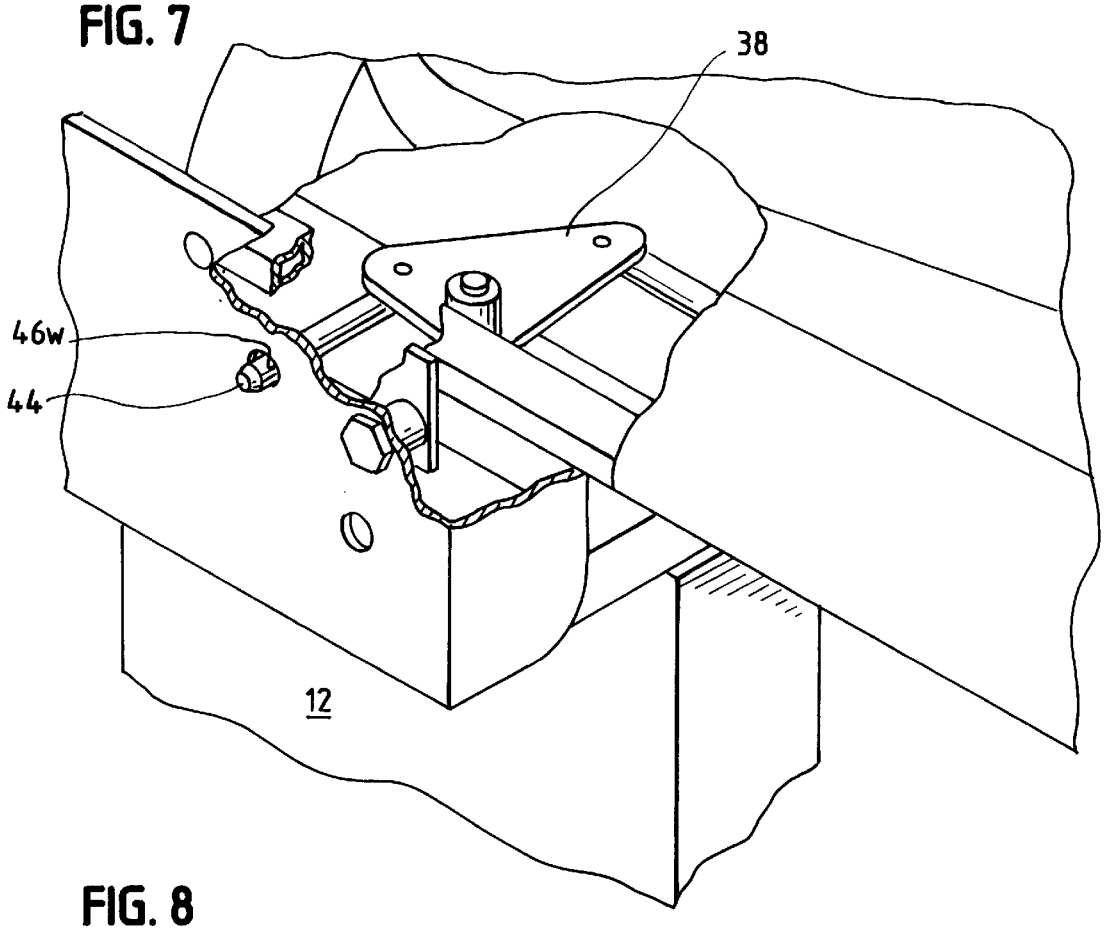
FIG. 7 is an enlarged prospective view of the broken away portion of the seat illustrated in FIG. 6.

As seen from FIG. 1 as well as FIG. 7, a similar aperture 46a to aperture 46 may be provided in frame 12 so that pin 44 may enter into it when seat 16 is in its first, generally horizontal position if desired, to lock seat bottom 16 into such position.

The above has been offered for illustrative purposes only, and is not intended to limit the scope of this invention, which is as defined in the claims below.

That which is claimed:

1. A folding seat which comprises a support frame, said seat support frame comprising a base adapted to be mounted on a floor, a seat supporting portion having frame members supported on said base and interconnecting opposing vertical walls at opposite lateral and longitudinal ends thereof, said vertical walls embracing a seat bottom, a stationary seat back frame rigidly attached to and extending upwardly from said seat supporting portion in a position rearwardly and laterally inwardly of portions of a seat back pivotally connected to said seat back frame at a position in a upper half of said seat back, said seat bottom having a pivotal connection to at least one of said vertical walls at a first pivot to permit said bottom to pivot from a generally horizontal first position to a generally vertical second position, said seat bottom being pivotally connected to a pivot arm system at a second pivot spaced from said first pivot such that the position of said pivotal connection of said seat bottom and said pivot arm system is above said first pivot when said seat bottom is in said first position and is below said first pivot when said seat bottom is in said second position, said pivot arm system being connected to said seat back at a position substantially at a bottom of said seat back, said pivot arm system moving said seat back rearwardly as said seat bottom is raised from the first to the second position causing said bottom to fold and nest with said seat back, said pivot arm system also moving the bottom of said seat back forwardly as said seat bottom is lowered from the second to the first position and a hand release rod mounted on said seat bottom to move with said seat bottom, said hand release rod being connected to a latch controls the release of said latch by gripping and moving the hand release rod when said seat bottom is in its first said generally horizontal extending position and in said second generally vertical extending position, said hand release rod extending proximately to a front of said seat bottom to enable a person to easily grip said hand release rod and move it to release said latch.

2. The folding seat of claim 1 in which said pivot arm system comprises a first pivot member rigidly attached to said seat bottom, a pivot arm pivotally attached to said first pivot member and occupying a position that is generally vertical when the seat bottom is generally horizontal and said pivot arm occupying a position that is generally horizontal when the seat bottom is generally vertical; and a second pivot member rigidly attached to said seat back and also pivotally attached to said pivot arm.

3. The folding seat of claim 2 in which said first pivot member swings an end of said pivot arm in an arc downwardly as the seat bottom moves from horizontal to vertical, so that the pivot arm pushes the seat back rearwardly as the pivot arm moves toward a generally horizontal position.

4. The folding passenger seat of claim 1, which carries lap and shoulder restraining belts that requires the folding passenger seat to be positioned with said bottom in its horizontal position and said lap and restraining belts are secured after a passenger sits on the seat bottom.

5. A folding passenger seat which comprises a support frame, said seat support frame comprising a base adapted to be mounted on a floor, a seat supporting portion having frame members supported on said base and interconnecting opposing vertical walls at opposite lateral and longitudinal ends thereof, said vertical walls embracing a seat bottom, a stationary seat back frame rigidly attached to and extending upwardly from said seat supporting portion in a position rearwardly and laterally inwardly of portions of a seat back pivotally connected to said seat back frame at a position in at least the upper half of said seat back, said seat bottom having a pivotal connection to said vertical walls at a first pivot to permit said seat bottom to pivot from a generally horizontal first position to a generally vertical second position, said seat bottom being connected to a pivot arm system at a second pivot spaced from said first pivot such that said second pivot is above said first pivot when said seat bottom is in said first position and said second pivot is below said first pivot when said seat bottom is in said second position, said pivot arm system being connected to said seat back at a position substantially at a bottom of said seat back, said pivot arm system moving the bottom of said seat back rearwardly as said seat bottom is raised from the first to the second position enabling said seat bottom to fold and nest with said back, said pivot arm system also moving said seat back forwardly as said seat bottom is lowered from the second to the first position, said pivot arm system comprising a first pivot member rigidly attached to said seat bottom, a pivot arm pivotally attached to said first pivot member and occupying a position that is generally vertical when the seat bottom is generally horizontal in the first position, and said first pivot arm occupying a position that is generally horizontal when the seat bottom is generally vertical in the second position, and a second pivot member rigidly attached to said seat back and also pivotally attached to said pivot arm, in which the seat bottom carries a hand release rod connected to control the release of a latch for releasable locking said seat bottom in the generally vertical second position and said hand release rod having a hand release thereon, wherein the hand release rod is mounted on said seat bottom to move with said seat bottom, said hand release being connected to said hand release rod to the release of said latch for releasably locking said seat bottom in its first said generally horizontal extending position, and in said second generally vertical extending position, said hand release being proximately disposed to a front of said seat bottom to enable a person to easily grip said hand release to operate it while seated in said seat.

6. The folding seat of claim 5 in which said first pivot member swings an end of said pivot arm in an arc downwardly as the seat bottom moves from horizontal to vertical, so that the pivot arm pushes the seat back rearwardly as the pivot arm moves toward a generally horizontal position.

\* \* \* \* \*